(12) United States Patent
Matsushita et al.

(10) Patent No.: US 12,325,317 B2
(45) Date of Patent: Jun. 10, 2025

(54) AUTONOMOUS WORK SYSTEM AND AUTONOMOUS WORK MACHINE

(71) Applicant: OMRON Corporation, Kyoto (JP)

(72) Inventors: Katsumi Matsushita, Kyoto (JP); Hiroyuki Mino, Kyoto (JP); Atsushi Nomura, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/470,440

(22) Filed: Sep. 20, 2023

(65) Prior Publication Data

US 2024/0109445 A1 Apr. 4, 2024

(30) Foreign Application Priority Data

Oct. 3, 2022 (JP) ................. 2022-159251

(51) Int. Cl.
| | |
|---|---|
| *B60L 53/36* | (2019.01) |
| *A01D 34/00* | (2006.01) |
| *A01D 34/78* | (2006.01) |
| *A01D 101/00* | (2006.01) |
| *B60L 53/12* | (2019.01) |
| *B60L 53/38* | (2019.01) |

(Continued)

(52) U.S. Cl.
CPC ............ *B60L 53/36* (2019.02); *A01D 34/008* (2013.01); *A01D 34/78* (2013.01); *B60L 53/12* (2019.02); *B60L 53/38* (2019.02); *H02J 50/10* (2016.02); *H02J 50/90* (2016.02); *A01D 2101/00* (2013.01); *B60L 2200/40* (2013.01)

(58) Field of Classification Search
CPC .......... B60L 53/36; B60L 53/12; B60L 53/38; B60L 2200/40; A01D 34/008; A01D 34/78; A01D 2101/00; H02J 50/10; H02J 50/90; G05D 1/661; G05D 1/0225
See application file for complete search history.

(56) References Cited

U.S. PATENT DOCUMENTS

2018/0370376 A1\* 12/2018 Liu ................ G05D 1/0225
2019/0227574 A1\* 7/2019 Du .................. G01S 15/931
(Continued)

FOREIGN PATENT DOCUMENTS

JP 2022-64681 A 4/2022

*Primary Examiner* — Rexford N Barnie
*Assistant Examiner* — Rasem Mourad
(74) *Attorney, Agent, or Firm* — SHINJYU GLOBAL IP (57) ABSTRACT

An autonomous work system includes a charging station and an autonomous work machine. The charging station includes a power transmitter unit. The autonomous work machine includes a traveling body, a motor, a battery, and a power receiver unit. The battery supplies electric power to the motor. The autonomous work machine performs a predetermined task while autonomously traveling, moves to the charging station to charge the battery by wireless power transfer. The power transmitter unit includes a power-transmitting coil. The power-transmitting coil is arranged parallel to an installation surface on which the charging station is placed. The power receiver unit includes a power-receiving coil. The receiving coil is arranged parallel to the installation surface. The autonomous work machine moves to the charging station so that the power-receiving coil is positioned above the power-transmitting coil, and charges the battery.

10 Claims, 6 Drawing Sheets

(51) Int. Cl.
*H02J 50/10* (2016.01)
*H02J 50/90* (2016.01)

(56) References Cited

U.S. PATENT DOCUMENTS

| | | | | |
|---|---|---|---|---|
| 2021/0162986 A1* | 6/2021 | Sakai | ............. | B60L 53/36 |
| 2021/0251137 A1* | 8/2021 | Muro | ............. | G05D 1/0265 |
| 2021/0330165 A1* | 10/2021 | Lee | ............. | H02J 50/10 |
| 2022/0110244 A1 | 4/2022 | Kawai | | |
| 2023/0393578 A1* | 12/2023 | Conti | ............. | G05D 1/0255 |
| 2024/0155974 A1* | 5/2024 | Takahashi | ............. | A01D 34/008 |

* cited by examiner

AUTONOMOUS WORK SYSTEM AND AUTONOMOUS WORK MACHINE

CROSS-REFERENCE TO RELATED APPLICATION

This application claims priority to Japanese Patent Application No. 2022-159251, filed Oct. 3, 2022. The contents of that application are incorporated by reference herein in their entirety.

FIELD

The claimed invention relates to an autonomous work system and an autonomous work machine.

BACKGROUND

Conventionally, an autonomous work system is known that includes an autonomous work machine that autonomously travels to perform a predetermined task, and a charging station that charges the autonomous work machine. For example, in Japanese Patent Application Publication No. 2022-064681, an autonomous work machine autonomously travels to mow a work site. A charging station is located at the work site. The autonomous work machine includes a connector for electrically connecting the charging station and the autonomous work machine. The connector is arranged on the front surface of the autonomous work machine. The autonomous work machine moves toward the charging station and connects the connector to the charging station. The autonomous work machine is thereby charged.

SUMMARY

In the autonomous work machine described above, the connector is arranged on the front surface of the autonomous work machine. Therefore, when charging, the autonomous work machine moves toward the charging station such that the connector on the autonomous work machine faces the connector on the charging station in the front-rear direction. Therefore, the direction in which the autonomous work machine approaches the charging station is limited, and it is not easy to smoothly move the autonomous work machine to the charging station. An object of the claimed invention is to improve a degree of freedom in an approach direction of an autonomous work machine to a charging station.

An autonomous work system according to one aspect of the claimed invention includes a charging station and an autonomous work machine. The charging station includes a power transmitter unit for wireless power transfer. The autonomous work machine includes a traveling body, a motor, a battery, and a power receiver unit for wireless power transfer. The motor causes the traveling body to travel. The battery provides electric power to the motor. The autonomous work machine performs a predetermined task while autonomously traveling, returns to the charging station, and charges the battery by the wireless power transfer. The power transmitter unit includes a power-transmitting coil. The power-transmitting coil is arranged parallel to an installation surface on which the charging station is placed. The power receiver unit includes a power-receiving coil. The power-receiving coil is arranged parallel to the installation surface. The autonomous work machine moves to the charging station so that the power-receiving coil is positioned above the power-transmitting coil, and charges the battery.

An autonomous work machine according to another aspect of the claimed invention performs a predetermined task while autonomously traveling, and is charged from a charging station by wireless power transfer. The charging station includes a power-transmitting coil. The power-transmitting coil is arranged parallel to an installation surface on which the charging station is placed. The autonomous work machine includes a traveling body, a motor, a power-receiving coil, a battery, and a controller. The motor causes the traveling body to travel. The power-receiving coil is arranged parallel to the installation surface. The battery is charged by wireless power transfer between the power-transmitting coil and the power-receiving coil, and supplies electric power to the motor. The controller causes the autonomous work machine to move to the charging station so that the power-receiving coil is positioned above the power-transmitting coil, and charges the battery.

According to the claimed invention, the power-receiving coil and the power-transmitting coil are arranged parallel to the installation surface of the charging station. The autonomous work machine moves to the charging station so that the power-receiving coil is positioned above the power-transmitting coil, and charges the battery. Therefore, the autonomous work machine can approach the charging station from various directions to position the power-receiving coil above the power-transmitting coil. As a result, the degree of freedom in the approach direction of the autonomous work machine to the charging station is improved.

DETAILED DESCRIPTION

Figure 1:
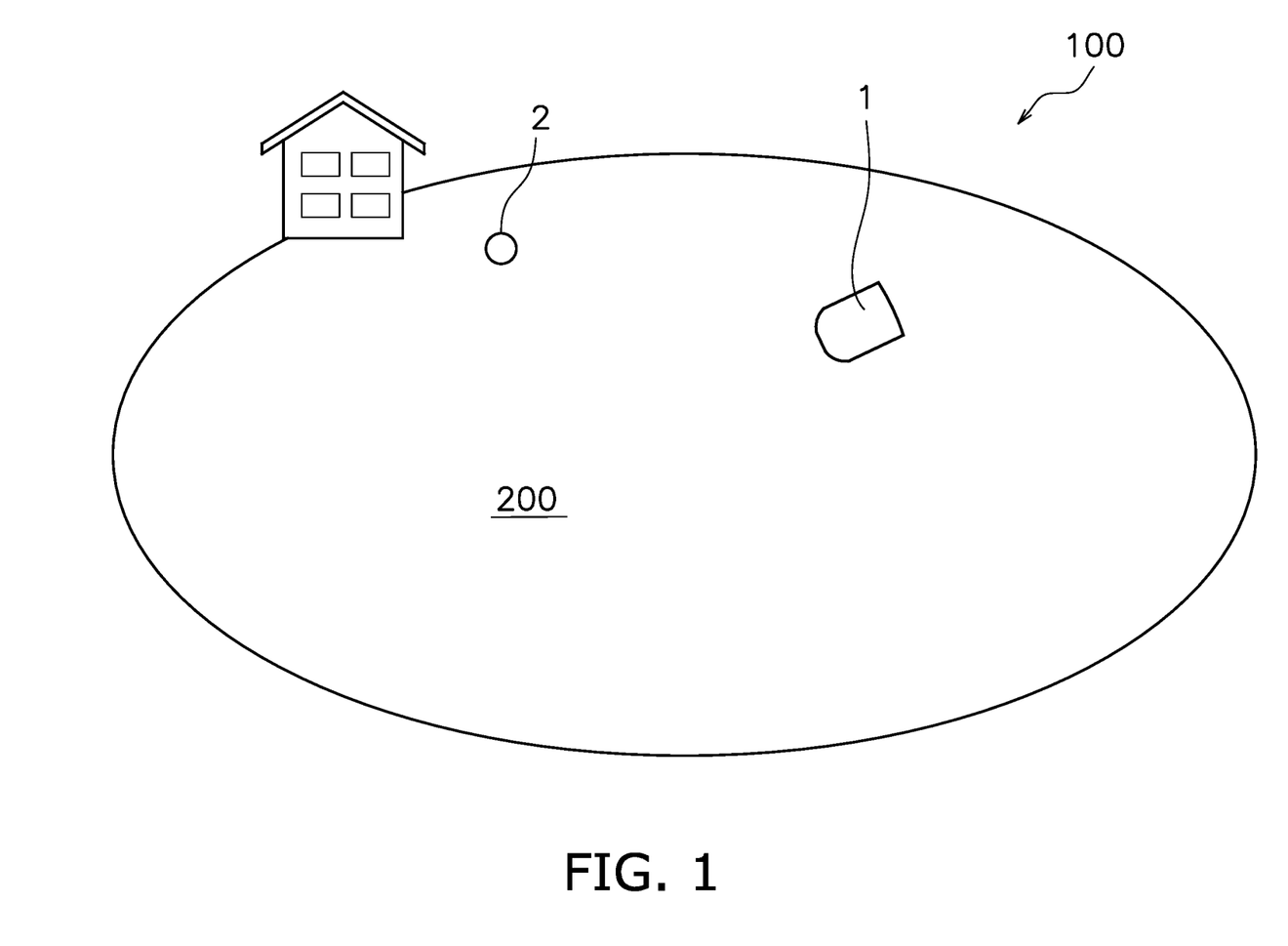
FIG. 1 is a diagram showing an autonomous work system according to an embodiment and a work area in which the autonomous work system is arranged.

An autonomous work system according to an embodiment of the claimed invention will be described below with reference to the drawings. FIG. 1 is a diagram showing an autonomous work system 100 according to the present embodiment and a work area 200 in which the autonomous work system 100 is arranged. The autonomous work system 100 includes an autonomous work machine 1 and a charging station 2. The autonomous work machine 1 may be, for example, an automatic lawn mower that mows lawn grass while traveling autonomously and unmanned in the outdoor work area 200.

The charging station 2 is arranged in the work area 200. The charging station 2 supplies electric power to the autonomous work machine 1. The charging station 2 is also a standby place for the autonomous work machine 1 when not working. At the start of work, the autonomous work machine 1 leaves the charging station 2 and performs lawn mowing work within the work area 200. The autonomous work machine 1 automatically returns to the charging station 2 and is charged at the charging station 2.

Figure 2:
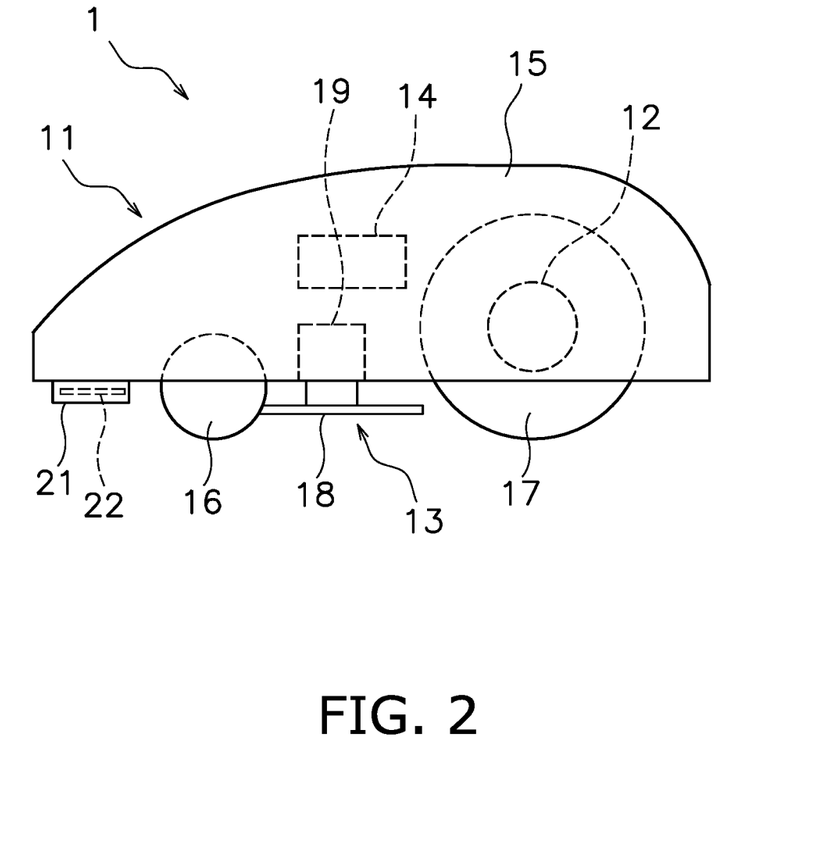
FIG. 2 is a side view of an autonomous work machine.

FIG. 2 is a side view of the autonomous work machine 1. As shown in FIG. 2, the autonomous work machine 1 includes a traveling body 11, a travel motor 12, a work tool 13, and a battery 14. The traveling body 11 includes a housing 15, front wheels 16, and rear wheels 17. The front wheels 16 are provided at the front of the housing 15. The rear wheels 17 are provided at the rear of the housing 15.

The travel motor 12 is an electric motor and rotates the rear wheels 17. Thereby, the traveling body 11 travels. Alternatively, the travel motor 12 may rotate the front wheels 16. The travel motor 12 may rotate the left and right rear wheels 17 or the left and right front wheels 16 independently. The autonomous work machine 1 may turn due to the difference in rotational speed between the left and right rear wheels 17 or the left and right front wheels 16. Alternatively, the autonomous work machine 1 may turn by steering the rear wheels 17 or the front wheels 16 left and right.

The work tool 13 is provided on a bottom portion of the housing 15. The work tool 13 is used for performing a task by the autonomous work machine 1. In the present embodiment, the work tool 13 includes a cutting blade 18 and a work motor 19. The work motor 19 is an electric motor and rotates the cutting blade 18. The work tool 13 cuts grass by rotating the cutting blade 18. The battery 14 is charged by the charging station 2. The battery 14 supplies electric power to the travel motor 12 and the work motor 19.

Figure 3:
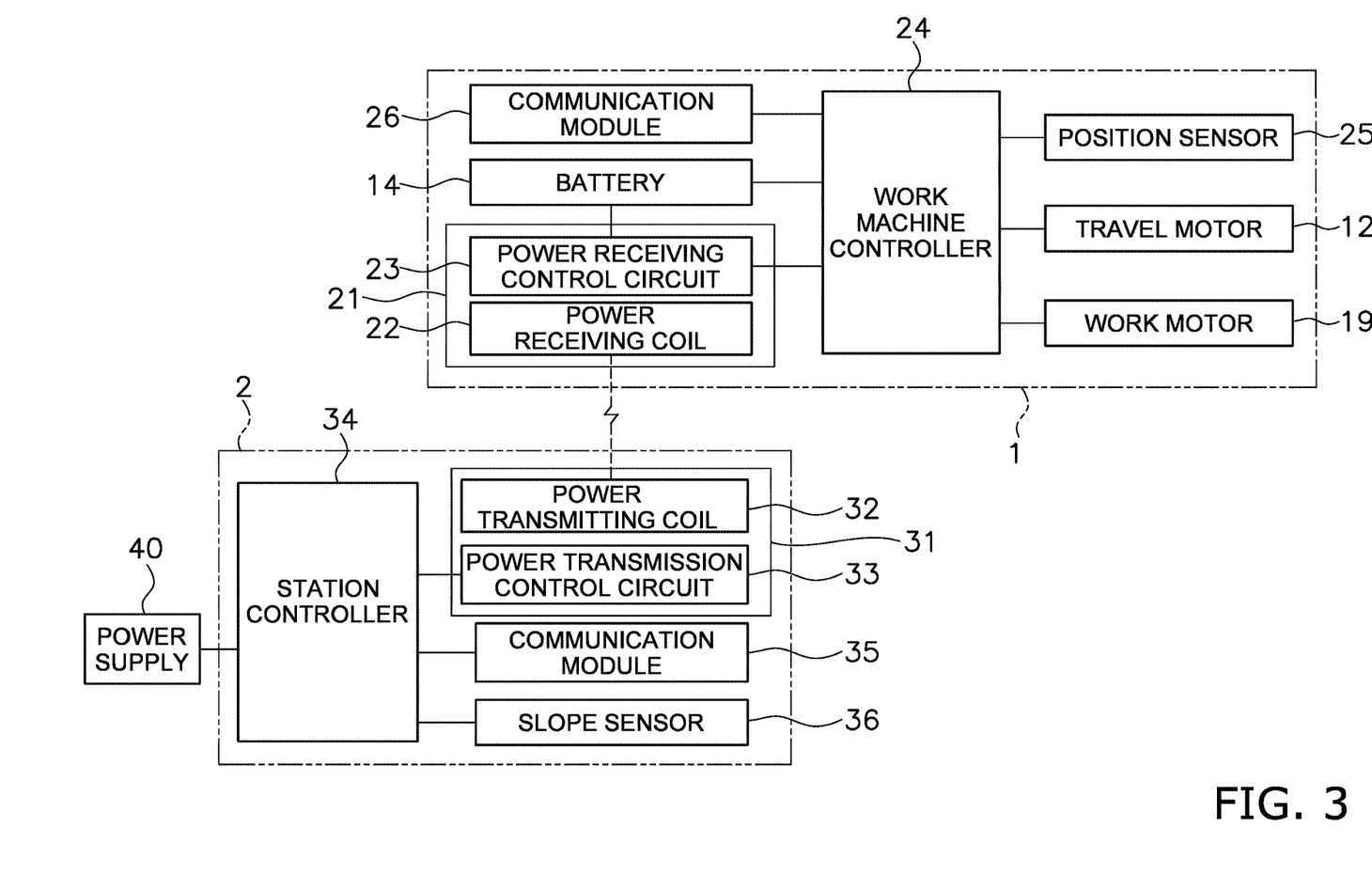
FIG. 3 is a block diagram showing a configuration of the autonomous work machine and a charging station.

FIG. 3 is a block diagram showing configurations of the autonomous work machine 1 and the charging station 2. As shown in FIG. 3, the autonomous work machine 1 includes a power receiver unit 21 for wireless power transfer. The charging station 2 includes a power transmitter unit 31 for wireless power transfer. The autonomous work machine 1 performs lawn mowing work while autonomously traveling with the electric power stored in the battery 14. The autonomous work machine 1 charges the battery 14 by wireless power transfer at the charging station 2.

The power transmitter unit 31 includes a power-transmitting coil 32 and a power-transmission control circuit 33. The power-transmitting coil 32 is a coil for supplying the electric power. The power-transmission control circuit 33 converts the electric power supplied from a commercial power supply 40 into the electric power of a predetermined frequency for generating a magnetic field in the power-transmitting coil 32 and supplies the electric power to the power-transmitting coil 32.

The power receiver unit 21 includes a power-receiving coil 22 and a power-receiving control circuit 23. The power-receiving coil 22 is a coil for extracting the electric power. The power-receiving coil 22 is magnetically coupled with the power-transmitting coil 32 and receives the electric power from the power-transmitting coil 32 by electromagnetic induction method. Note that the electromagnetic induction method may include means for forming a resonance circuit in at least one of the power-transmitting coil 32 and the power-receiving coil 22. The power-receiving control circuit 23 converts the electric power generated by the power-receiving coil 22 into the electric power for charging the battery 14 and supplies the electric power to the battery 14. The battery 14 is thereby charged.

The autonomous work machine 1 includes a work machine controller 24. The work machine controller 24 controls the operation of the autonomous work machine 1.

The work machine controller 24 includes, for example, a processor such as a CPU (Central Processing Unit), and memories such as RAM (Random Access Memory) and ROM (Read Only Memory).

The work machine controller 24 stores data and programs for performing work by the autonomous work machine 1. For example, the work machine controller 24 stores map data of the work area 200 and schedule data for mowing the lawn. The work machine controller 24 causes the autonomous work machine 1 to travel by controlling the travel motor 12. The work machine controller 24 performs lawn-mowing work by controlling the work motor 19 while running the autonomous work machine 1.

The autonomous work machine 1 includes a position sensor 25. The position sensor 25 detects the position of the autonomous work machine 1. The position sensor 25 includes, for example, an IMU (Inertial Measurement Unit). The position sensor 25 detects the position of the autonomous work machine 1 and the position of the charging station 2 within the work area 200 based on the relative position with respect to the charging station 2, for example. Alternatively, the position sensor 25 may include a receiver such as a GPS (Global Positioning System). The position sensor 25 may detect coordinates indicating the position of the autonomous work machine 1 and coordinates indicating the position of the charging station 2.

The work machine controller 24 determines whether a predetermined return condition is satisfied. The return condition may, for example, be that the remaining power of the battery 14 is equal to or less than a threshold. Alternatively, the return condition may be that the lawn-mowing work in the work area 200 has been completed. Alternatively, the return condition is that the end time of the task has come. The work machine controller 24 controls the autonomous work machine 1 to move to the charging station 2 when determining that the return condition is satisfied.

The charging station 2 includes a station controller 34. The station controller 34 includes, for example, a processor such as a CPU (Central Processing Unit), and memories such as RAM (Random Access Memory) and ROM (Read Only Memory). The station controller 34 controls the power transmission by the power transmitter unit 31.

Figure 4:
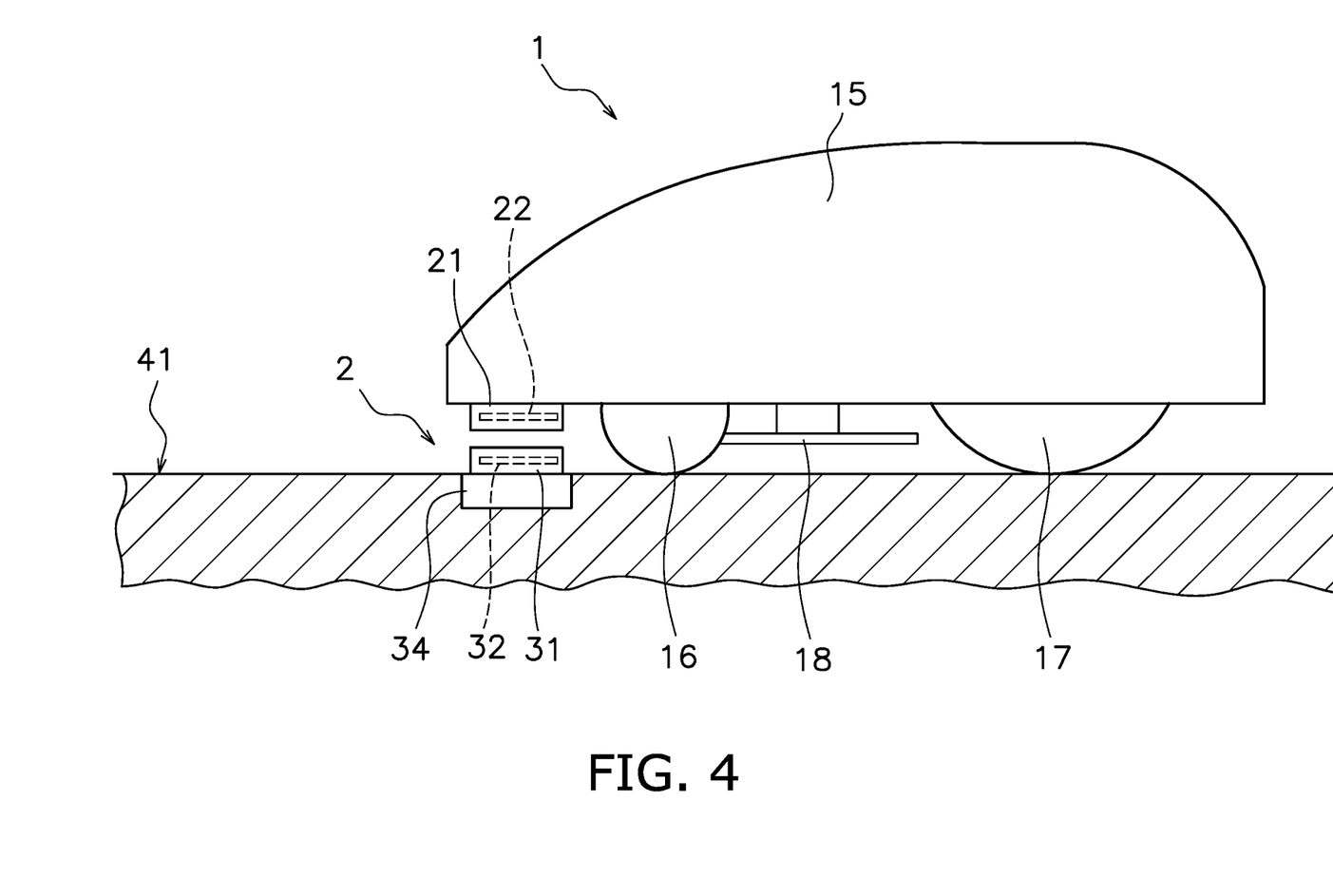
FIG. 4 is a side view showing the autonomous work machine and the charging station during charging.

When the autonomous work machine 1 reaches the charging station 2, the battery 14 is charged by wireless power transfer from the power receiver unit 21 and the power transmitter unit 31. FIG. 4 is a side view showing the autonomous work machine 1 and the charging station 2 during charging. As shown in FIG. 4, the charging station 2 is arranged on an installation surface 41. The installation surface 41 may be the ground within the work area 200.

The power-transmitting coil 32 is arranged parallel to the installation surface 41. That is, the power-transmitting coil 32 is arranged such that the central axis of the power-transmitting coil 32 is perpendicular to the installation surface 41. The power-receiving coil 22 is arranged on the bottom surface of traveling body 11. The power-receiving coil 22 is arranged at the front portion of the bottom surface of the traveling body 11. The power-receiving coil 22 is arranged to be parallel to the installation surface 41 when the autonomous work machine 1 is supported on the installation surface 41. That is, the power-receiving coil 22 is arranged such that the central axis of the power-receiving coil 22 is perpendicular to the installation surface 41. The autonomous work machine 1 moves to the charging station 2 so that the power-receiving coil 22 is positioned above the power-transmitting coil 32 and charges the battery 14.

Figure 5:
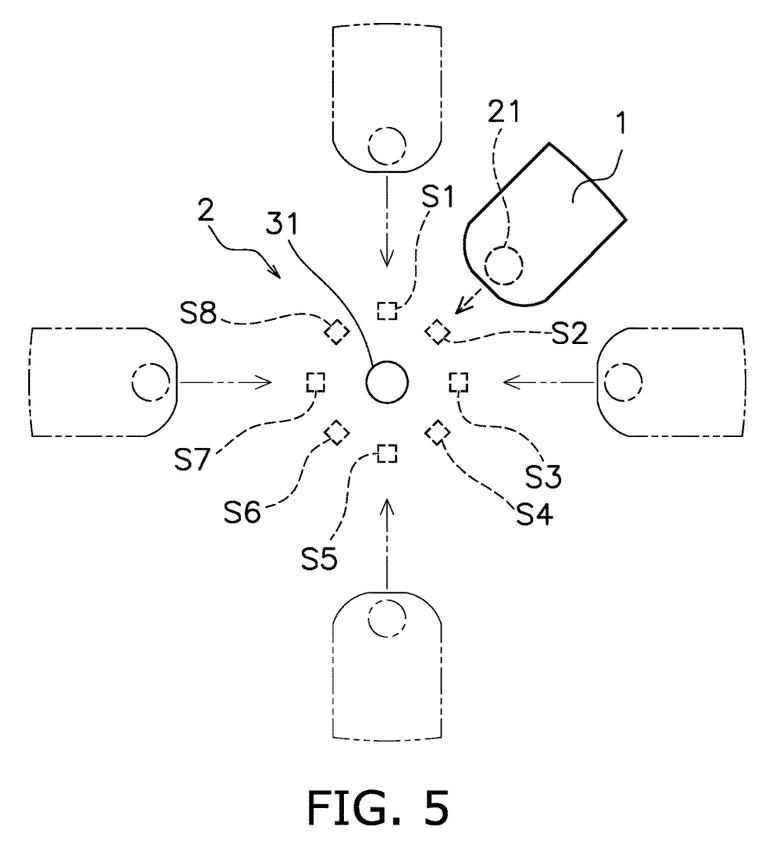
FIG. 5 is a top view of the autonomous work machine and the charging station.

FIG. 5 is a top view of the charging station 2 and the autonomous work machine 1. As shown in FIG. 5, the charging station 2 is configured so that the autonomous work machine 1 can access the charging station 2 from multiple directions. For example, the charging station 2 is configured so that the autonomous work machine 1 can access the charging station 2 from all directions of 360 degrees around the charging station 2.

As shown in FIG. 3, the charging station 2 includes a communication module 35. The autonomous work machine 1 includes a communication module 26. The communication modules 26 and 35 perform wireless communication using, for example, infrared rays or radio waves. The charging station 2 and the autonomous work machine 1 transmit and receive data via the communication modules 26 and 35.

The charging station 2 includes a slope sensor 36. The slope sensor 36 detects the slope angle of the installation surface 41 on which the charging station 2 is arranged. The station controller 34 transmits data indicating the slope angle of the installation surface 41 detected by the slope sensor 36 to the work machine controller 24 via the communication modules 26 and 35. The work machine controller 24 acquires the data indicating the slope angle of the installation surface 41 from the station controller 34. The slope sensor 36 includes a plurality of angle sensors S1 to S8 as shown in FIG. 5. The angle sensors S1 to S8 detect the slope angles of the installation surface 41 from the charging station 2 in a plurality of directions.

The work machine controller 24 acquires the slope angles of the installation surface 41 in the plurality of directions from the charging station 2. The work machine controller 24 determines the direction with the smallest slope angle as the approach direction to the charging station 2. For example, when the slope angle of the installation surface 41 in the northeast direction from the charging station 2 is the smallest, the work machine controller 24 determines the northeast direction as the approach direction to the charging station 2. The work machine controller 24 controls the autonomous work machine 1 to approach the charging station 2 from the northeast direction.

According to the autonomous work system 100 according to the present embodiment described above, the power-receiving coil 22 and the power-transmitting coil 32 are arranged parallel to the installation surface 41 of the charging station 2. The autonomous work machine 1 moves to the charging station 2 so that the power-receiving coil 22 is positioned above the power-transmitting coil 32 and charges the battery 14. Therefore, the autonomous work machine 1 can approach the charging station 2 from various directions to position the power-receiving coil 22 above the power-transmitting coil 32. As a result, the degree of freedom in the approach direction of the autonomous work machine 1 to the charging station 2 is improved.

The work machine controller 24 determines the approach direction to the charging station 2 according to the slope angle of the installation surface 41 of the charging station 2. Therefore, the positional deviation between the power-transmitting coil 32 and the power-receiving coil 22 due to the positional deviation of the autonomous work machine 1 with respect to the power transmitter unit 31 due to the slope of the installation surface 41 can be reduced. As a result, the power supply efficiency in the charging station 2 is improved.

Although one embodiment of the claimed invention has been described above, the claimed invention is not limited to the above-described embodiment, and various modifications are possible without departing from the scope of the invention.

The autonomous work machine 1 is not limited to an automatic lawn mower and may be another automatic machine. For example, the autonomous work machine 1 may be an automatic guided vehicle. The autonomous work machine 1 may transport a load by autonomously traveling in a work area in a factory or a warehouse, for example. In that case, the installation surface 41 may be an indoor floor.

The configuration of the charging station 2 is not limited to that of the above embodiment and may be modified. For example, the charging station 2 may be configured such that access of the autonomous work machine 1 from some directions is restricted. The configuration of the autonomous work machine 1 is not limited to that of the above embodiment, and may be modified. For example, the power receiver unit 21 may be arranged at the central portion or the rear portion of the traveling body 11.

Figure 6:
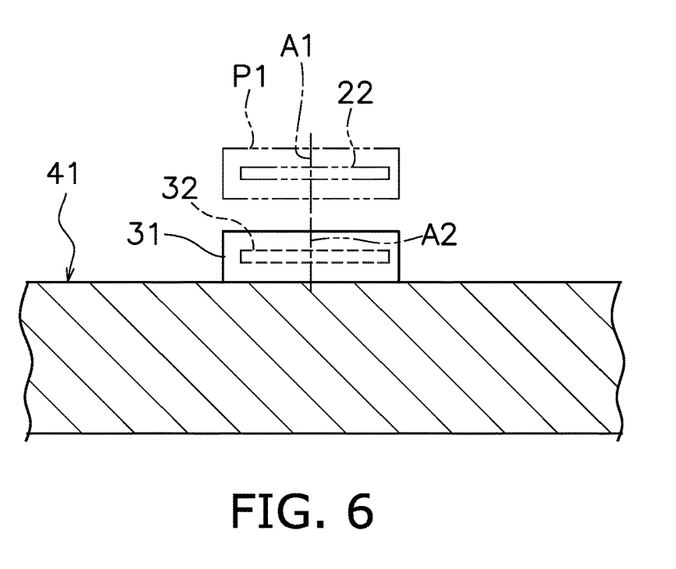
FIG. 6 is a side view showing a power transmitter unit and a target position of a power receiver unit during charging.

The control of the autonomous work machine 1 by the work machine controller 24 is not limited to that of the above embodiment and may be modified. For example, as shown in FIG. 6, the work machine controller 24 stores a target position P1 of the power receiver unit 21 based on the position of the power-transmitting coil 32. The target position P1 is a position where the central axis A1 of the power-receiving coil 22 coincides with the central axis A2 of the power-transmitting coil 32. When charging the battery 14, the work machine controller 24 moves the autonomous work machine 1 to the charging station 2 so that the power-receiving coil 22 is positioned at the target position P1.

Figure 7A:
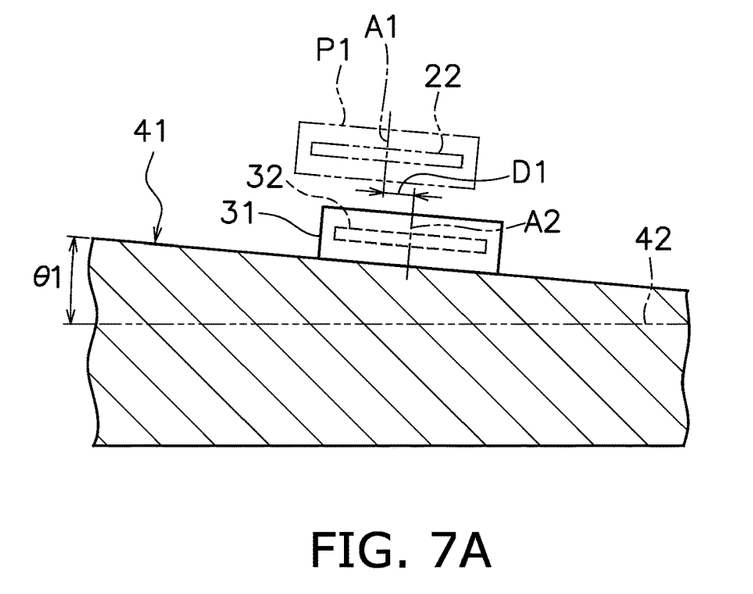
FIG. 7A is a side view showing the power transmitter unit and a corrected target position of the power receiver unit during charging.

As shown in FIG. 7A, when the installation surface 41 is inclined with respect to the horizontal surface 42, the work machine controller 24 corrects the target position P1 according to the slope angle $\theta 1$ of the installation surface 41. For example, the work machine controller 24 corrects the target position P1 by a correction distance D1 in a direction parallel to the installation surface 41 toward the upper side of the slope. The correction distance D1 may be a constant value. Alternatively, the correction distance D1 may be variable. For example, the work machine controller 24 may increase the correction distance D1 as the slope angle $\theta 1$ increases.

Figure 7B:
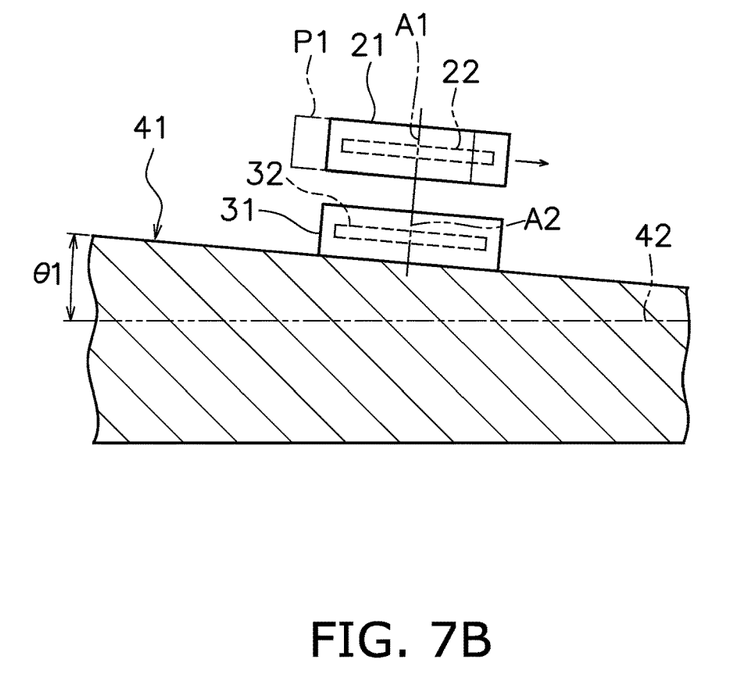
FIG. 7B is a side view showing the power transmitter unit and the power receiver unit during charging.

In this case, as shown in FIG. 7B, even if the position of the autonomous work machine 1 deviates from the target position P1 due to the influence of gravity due to the slope of the installation surface 41, the deviation of the central axis A1 of the power-receiving coil 22 from the central axis A2 of the power-transmitting coil 32 can be reduced.

REFERENCE SIGNS LIST

1: Autonomous work machine, 2: Charging station, 11: Travelling body, 12: Travel motor, 14: Battery, 21: Power receiver unit, 22: Power-receiving coil, 31: Power transmitter unit, 32: Power-transmitting coil, 36: Slope sensor

The invention claimed is:

1. An autonomous working system, comprising:
a charging station including a power transmitter unit for wireless power transfer; and
an autonomous work machine including
a travelling body,
a motor to propel the travelling body,
a battery to supply electric power to the motor, and
a power receiver unit for the wireless power transfer, the autonomous work machine being configured to perform a predetermined task while autonomously traveling and to move to the charging station to charge the battery by the wireless power transfer,
the power transmitter unit including a power-transmitting coil arranged to be parallel to an installation surface on which the charging station is supported when the charging station is supported on the installation surface,
the power receiver unit including a power-receiving coil arranged to be parallel to the installation surface when the autonomous work machine is supported on the installation surface, and
the autonomous work machine being configured to move to the charging station such that the power-receiving coil is positioned above the power-transmitting coil to wirelessly charge the battery,
wherein the charging station includes a sensor that detects a slope angle of the installation surface when the charging station is supported on the installation surface, and
the autonomous work machine is configured to acquire the slope angle detected by the sensor and to determine an approach direction to the charging station based on the slope angle.

2. The autonomous work system according to claim 1, wherein the power-receiving coil is arranged on a bottom surface of the traveling body.

3. The autonomous work system according to claim 1, wherein the sensor detects a plurality of slope angles of the installation surface in a plurality of directions from the charging station, and
the autonomous work machine is configured to determine the direction in which the slope angle of the plurality of detected slope angles is the smallest as an approach direction to the charging station.

4. An autonomous working system, comprising:
a charging station including a power transmitter unit for wireless power transfer; and
an autonomous work machine including
a travelling body,
a motor to propel the travelling body,
a battery to supply electric power to the motor, and
a power receiver unit for the wireless power transfer,
the autonomous work machine being configured to perform a predetermined task while autonomously traveling and to move to the charging station to charge the battery by the wireless power transfer,
the power transmitter unit including a power-transmitting coil arranged to be parallel to an installation surface on which the charging station is supported when the charging station is supported on the installation surface,
the power receiver unit including a power-receiving coil arranged to be parallel to the installation surface when the autonomous work machine is supported on the installation surface, and
the autonomous work machine being configured to move to the charging station such that the power-receiving coil is positioned above the power-transmitting coil to wirelessly charge the battery,
wherein the charging station includes a sensor that detects a slope angle of the installation surface, and
the autonomous work machine is configured to
store a target position based on a position of the power-transmitting coil,
to charge the battery, move to the charging station so that the power-receiving coil is positioned at the target position,
acquire the slope angle detected by the sensor, and correct the target position based on the slope angle.

5. The autonomous work system according to claim 1, wherein the autonomous work machine is an automatic lawn mower.

6. An autonomous work machine for performing a predetermined task while autonomously traveling, the autonomous work machine being configured to be charged by wireless power transfer from a charging station, the charging station including a power-transmitting coil and a sensor, the power-transmitting coil being arranged parallel to an installation surface on which the charging station is supported, the sensor being configured to detect a slope angle of the installation surface, the autonomous work machine comprising:
a travelling body;
a motor to propel the travelling body;
a power-receiving coil arranged to be parallel to the installation surface when the autonomous work machine is supported by the installation surface;
a battery configured to be charged by the wireless power transfer between the power-transmitting coil and the power-receiving coil and to supply electric power to the motor; and
a controller configured to
cause the autonomous work machine to move to the charging station so that the power-receiving coil is positioned above the power-transmitting coil to charge the battery and
acquire the slope angle of the installation surface when the autonomous work machine is supported by the installation surface and to determine an approach direction to the charging station based on the slope angle.

7. The autonomous work machine according to claim 6, wherein the power-receiving coil is arranged on a bottom surface of the traveling body.

8. An autonomous work machine for performing a predetermined task while autonomously traveling, the autonomous work machine being configured to be charged by wireless power transfer from a charging station, the charging station including a power-transmitting coil arranged parallel to an installation surface on which the charging station is supported, the autonomous work machine comprising:
a travelling body;
a motor to propel the travelling body;
a power-receiving coil arranged to be parallel to the installation surface when the autonomous work machine is supported by the installation surface;
a battery configured to be charged by the wireless power transfer between the power-transmitting coil and the power-receiving coil and to supply electric power to the motor; and
a controller configured to cause the autonomous work machine to move to the charging station so that the power-receiving coil is positioned above the power-transmitting coil to charge the battery;
wherein the controller is configured to acquire a plurality of slope angles of the installation surface in a plurality of directions from the charging station and to determine the direction in which the slope angle of the plurality of acquired slope angles is the smallest as an approach direction to the charging station.

9. An autonomous work machine for performing a predetermined task while autonomously traveling, the autonomous work machine being configured to be charged by wireless power transfer from a charging station, the charging station including a power-transmitting coil and a sensor, the power-transmitting coil being arranged parallel to an installation surface on which the charging station is supported, the sensor being configured to detect a slope angle of the installation surface, the autonomous work machine comprising:

a travelling body;
    a motor to propel the travelling body;
    a power-receiving coil arranged to be parallel to the installation surface when the autonomous work machine is supported by the installation surface;
    a battery configured to be charged by the wireless power transfer between the power-transmitting coil and the power-receiving coil and to supply electric power to the motor; and
    a controller configured to
    cause the autonomous work machine to move to the charging station so that the power-receiving coil is positioned above the power-transmitting coil to charge the battery,
    store a target position based on a position of the power-transmitting coil
    to charge the battery, move the autonomous work machine to the charging station so that the power-receiving coil is positioned at the target position,
    acquire the slope angle of the installation surface, and
    correct the target position according to the slope angle.

10. The autonomous work machine according to claim 6, wherein the autonomous work machine is an automatic lawn mower.

\* \* \* \* \*